US012478990B2

(12) United States Patent
Liu et al.

(10) Patent No.: US 12,478,990 B2
(45) Date of Patent: Nov. 25, 2025

(54) SHOWERHEAD WITH WATER PASSAGE SWITCHING DEVICE

(71) Applicant: Xiamen Rainshower Co. Ltd., Xiamen (CN)

(72) Inventors: Hewei Liu, Xiamen (CN); Weifeng Zeng, Xiamen (CN); Zhengqi Zhu, Xiamen (CN)

(73) Assignee: XIAMEN RAINSHOWER CO., LTD., Xiamen (CN)

( * ) Notice: Subject to any disclaimer, the term of this patent is extended or adjusted under 35 U.S.C. 154(b) by 338 days.

(21) Appl. No.: 18/134,022

(22) Filed: Apr. 12, 2023

(65) Prior Publication Data

US 2023/0405613 A1 Dec. 21, 2023

(30) Foreign Application Priority Data

Apr. 12, 2022 (CN) ......................... 202220844176.5

(51) Int. Cl.
*B05B 1/18* (2006.01)
*B05B 1/16* (2006.01)

(52) U.S. Cl.
CPC ............ *B05B 1/185* (2013.01); *B05B 1/1654* (2013.01)

(58) Field of Classification Search
CPC .................................. B05B 1/18; B05B 1/185
See application file for complete search history.

(56) References Cited

U.S. PATENT DOCUMENTS

| | | | | |
|---|---|---|---|---|
| 7,100,845 B1 * | 9/2006 | Hsieh | B05B 1/1627 239/582.1 |
| 11,369,981 B2 * | 6/2022 | Lin | B05B 1/3026 |
| 11,376,610 B2 * | 7/2022 | Lin | B05B 1/1636 |
| 2015/0115065 A1 * | 4/2015 | Lin | B05B 1/1618 239/446 |
| 2018/0065131 A1 * | 3/2018 | Rogers | F16K 31/535 |
| 2020/0306774 A1 * | 10/2020 | Wang | B05B 1/185 |
| 2021/0245178 A1 * | 8/2021 | Rogers | B05B 1/3013 |
| 2023/0039121 A1 * | 2/2023 | Kao | B01D 35/04 |
| 2023/0405613 A1 * | 12/2023 | Liu | B05B 1/185 |
| 2024/0226940 A1 * | 7/2024 | Deng | B05B 12/002 |

* cited by examiner

*Primary Examiner* — Joseph A Greenlund

(57) ABSTRACT

A showerhead with a water passage switching structure is provided according to the present application. The showerhead includes a seat body, a water outlet body assembly, a water distribution valve and a knob. The water distribution valve is provided with at least one water distribution hole, and a water inlet end face of the water outlet body assembly is provided with several water-passing openings in a circumferential track with respect to the at least one water distribution hole, the water distribution valve is driven by the knob to rotate by 360°, thus, the water distribution valve, when rotating, can switch the at least one water distribution hole to be in communication between the water-passing openings.

12 Claims, 15 Drawing Sheets

A-A

SHOWERHEAD WITH WATER PASSAGE SWITCHING DEVICE

CROSS REFERENCE TO RELATED APPLICATIONS

This application is based upon and claims priority to Chinese Patent Application No. 202220844176.5, filed on Apr. 12, 2022, the entire contents of which are incorporated herein by reference.

FIELD

The present application relates to the technical field of showerheads, in particular to a showerhead with a water passage switching structure.

BACKGROUND

Showerheads are commonly used bathroom products, which can be generally divided into handheld showerheads, top spraying showerheads, and side spraying showerheads. Outlet water types of showerheads include massage water spray, showerhead water, bubble water spray, atomized water, etc. The Chinese patent with Application No. 2021113979886 discloses an easily switching water outlet structure that can switch between multiple water outlet manners. However, in this water spray switching method, the switching structure is not arranged in the center, therefore lacks aesthetic appeal, and moreover has a complex structure. The Chinese patent with Application No. 201420071821X discloses a showerhead with a central knob switching structure, but it can only achieve the switching of two types of functional water, and the water passages are complex.

In view of this, the inventor conducted in-depth research on the aforementioned deficiencies in the conventional technology, and thus, the present application is developed.

SUMMARY

An aspect of this application is to provide a showerhead with a water passage switching function, which is provided with a knob that can rotate by 360° circumferentially on a water outlet end face of the showerhead. By adjusting the rotation angle of the knob, it is very convenient to switch the water passages of the showerhead, and the showerhead has a long service life, and an assembly gap of a non water outlet region of its water outlet assembly is not prone to water leakage.

To achieve the above aspect, this application discloses a showerhead, which includes: a seat body, a water outlet body assembly, a water distribution valve and a knob.

The seat body includes a water inlet joint, and the water inlet joint is configured to connect externally a water outlet pipeline.

The water outlet body assembly is fixedly connected to the seat body. The water outlet body assembly includes at least two mutually separated water distribution passages, each of the water distribution passages generates a specific functional water spray. A water sealing chamber is formed between the seat body and the water outlet body assembly, the water outlet body assembly has a through passage formed at a central portion corresponding to the water sealing chamber, and the through passage is separated from the water passages inside the water outlet body assembly. Each of the water distribution passages is provided with at least one water-passing opening in an water inlet end face of the water outlet body assembly, and the water-passing openings are located inside the water sealing chamber and are arranged circumferentially by taking the central axis L of the water sealing chamber as the center and R as the radius of a circle.

The water distribution valve includes a valve body and a connecting rod, the valve body is in the shape of a disk, and an inner cavity of the water distribution valve forms a water holding chamber. The valve body is provided with a water inlet pipeline at a central portion of an end face, on one side, of the valve body, and the water inlet pipeline is in fluid communication with the water inlet joint. A connecting rod is fixedly connected to a central portion of an end face, on the other side, of the valve body, and the end face on this side of the valve body is provided with at least one water distribution hole. The valve body is disposed within the water sealing chamber, and the connecting rod is disposed to pass through the through passage. Water accessing through the water inlet joint flows into the water holding chamber only through the water inlet pipeline of the valve body, and flows out through the at least one water distribution hole.

The knob is arranged on an outer end face of the water outlet body assembly and fixedly connected to the connecting rod. The knob is rotated by an external force, and further drives the valve body to rotate by 360° about the central axis L, to allow the at least one water distribution hole of the valve body to be selectively in fluid communication with the respective water-passing openings of the water distribution passages entirely or partially, thereby achieving water passage switching for water spray of different functions.

With the above structural design, the seat body and the water outlet body assembly of the showerhead are fixedly connected, the water passage switching of the showerhead simply relies on the water distribution valve in the water sealing chamber, and the water distribution valve is driven to rotate by the knob to achieve a clockwise or counterclockwise circumferential rotation by 360°, thus, switching of different functions of water of the showerhead is realized, and the adjustment is very convenient. Moreover, since the water distribution valve is disposed within the water sealing chamber, the water flow accessing into the water sealing chamber will not seep outwards, that is, the region other than the water sealing chamber between the seat body and the water outlet assembly is a region without water, thus, avoiding water seepage or dripping or leakage in the assembly gap of the non water outlet region of the water outlet body assembly of the showerhead.

BRIEF DESCRIPTION OF THE DRAWINGS

The specific explanation provided as a non-limiting example better explains what the present application includes and how it can be implemented. Furthermore, the explanation refers to the drawings, in which.

DETAILED DESCRIPTION OF EMBODIMENTS

Figure 1:
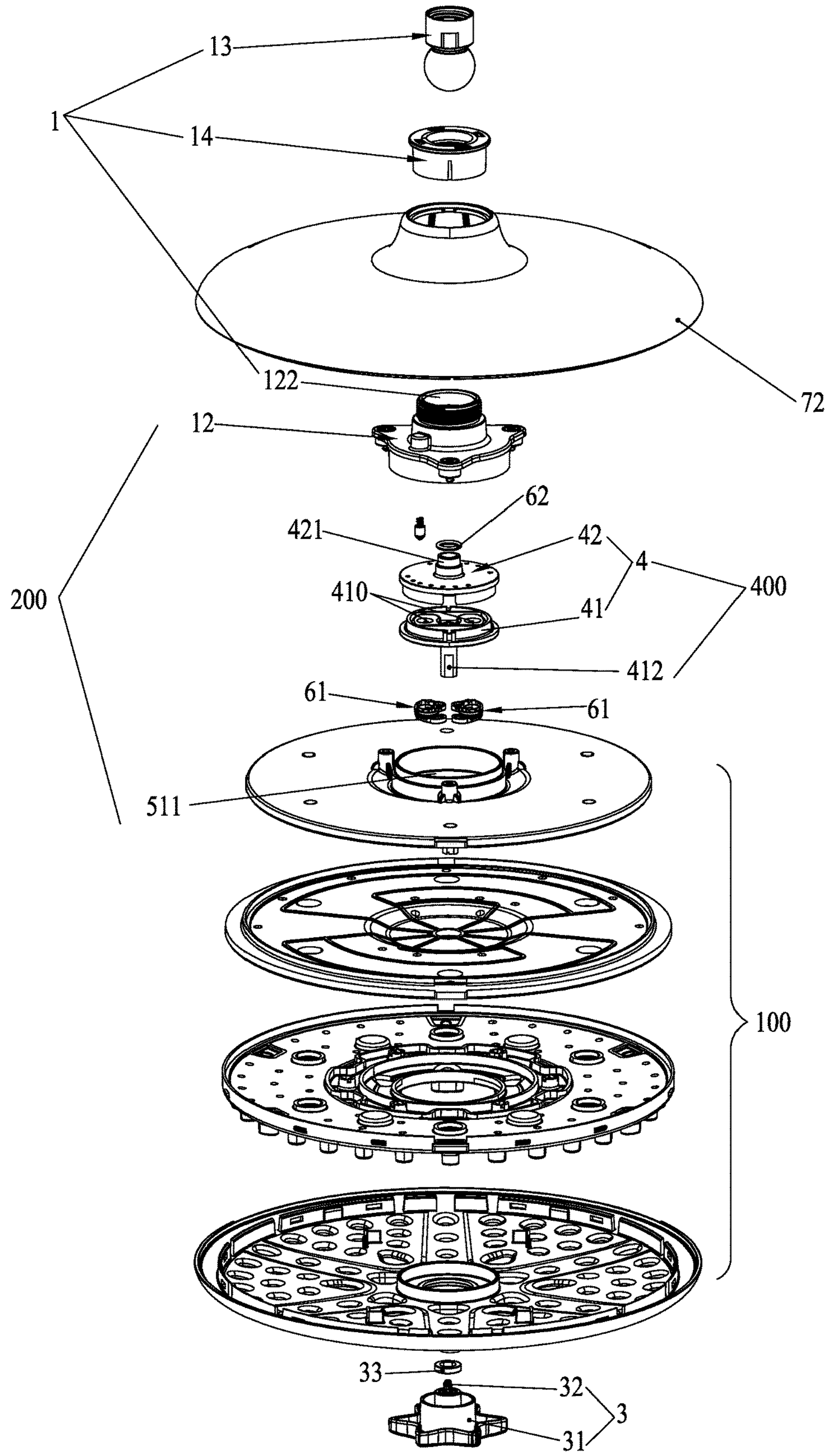
FIG. 1 is a schematic perspective exploded view of an embodiment of the present application.

The present application is described in detail hereinafter in conjunction with the drawings and embodiments.

As shown in FIGS. 1 to 20, a showerhead with a water passage switching structure is disclosed according to the present application, which includes a seat body 72, a water outlet body assembly 100, a water distribution valve 400 and a knob 31. The seat body 72 includes a water inlet joint 1, The water inlet joint 1 has a water inlet channel 11, which is configured to connect externally a water outlet pipeline.

Figure 4:
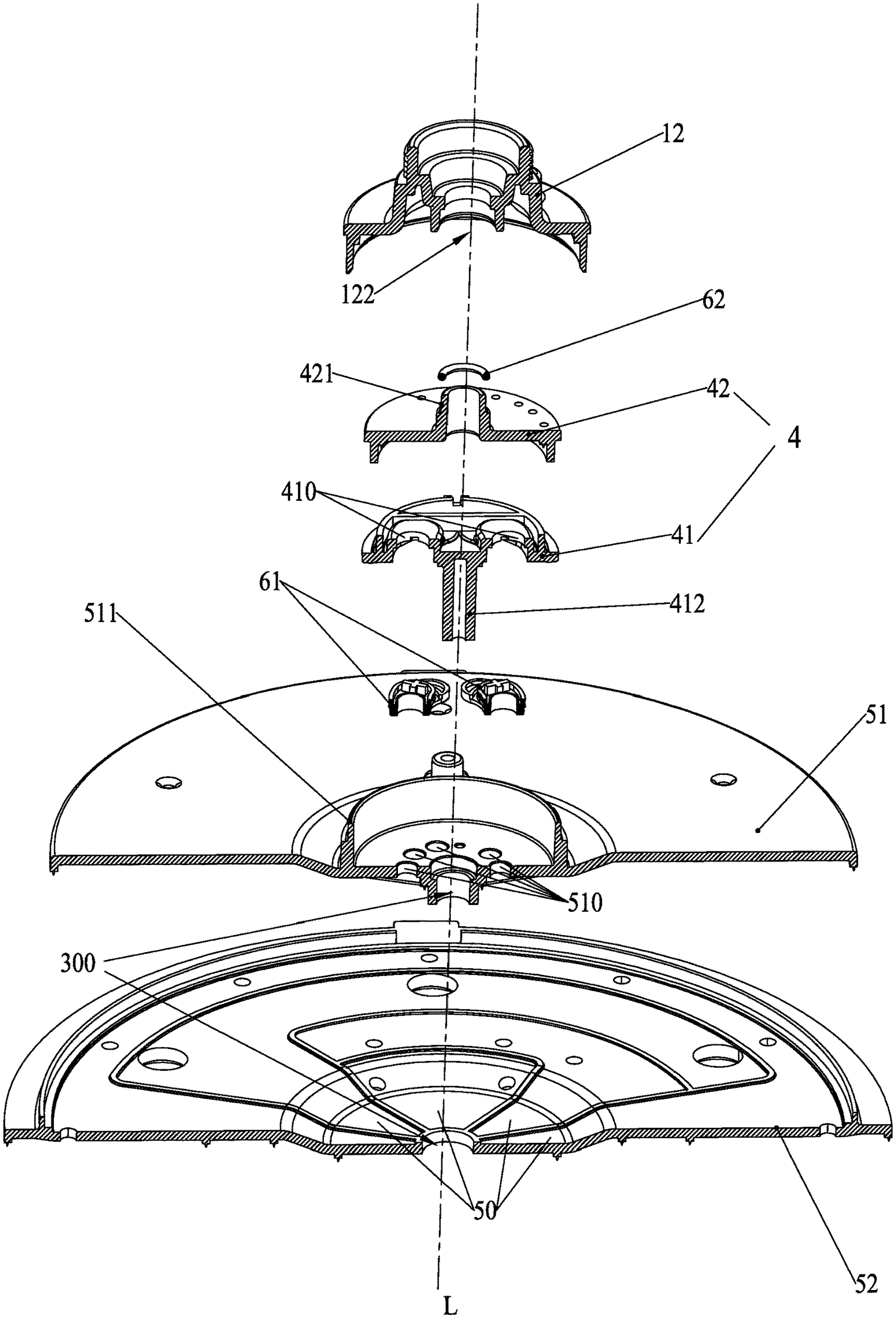
FIG. 4 is a schematic perspective semi-sectional view of parts according to an embodiment of the present application in an exploded state.
Figure 7:
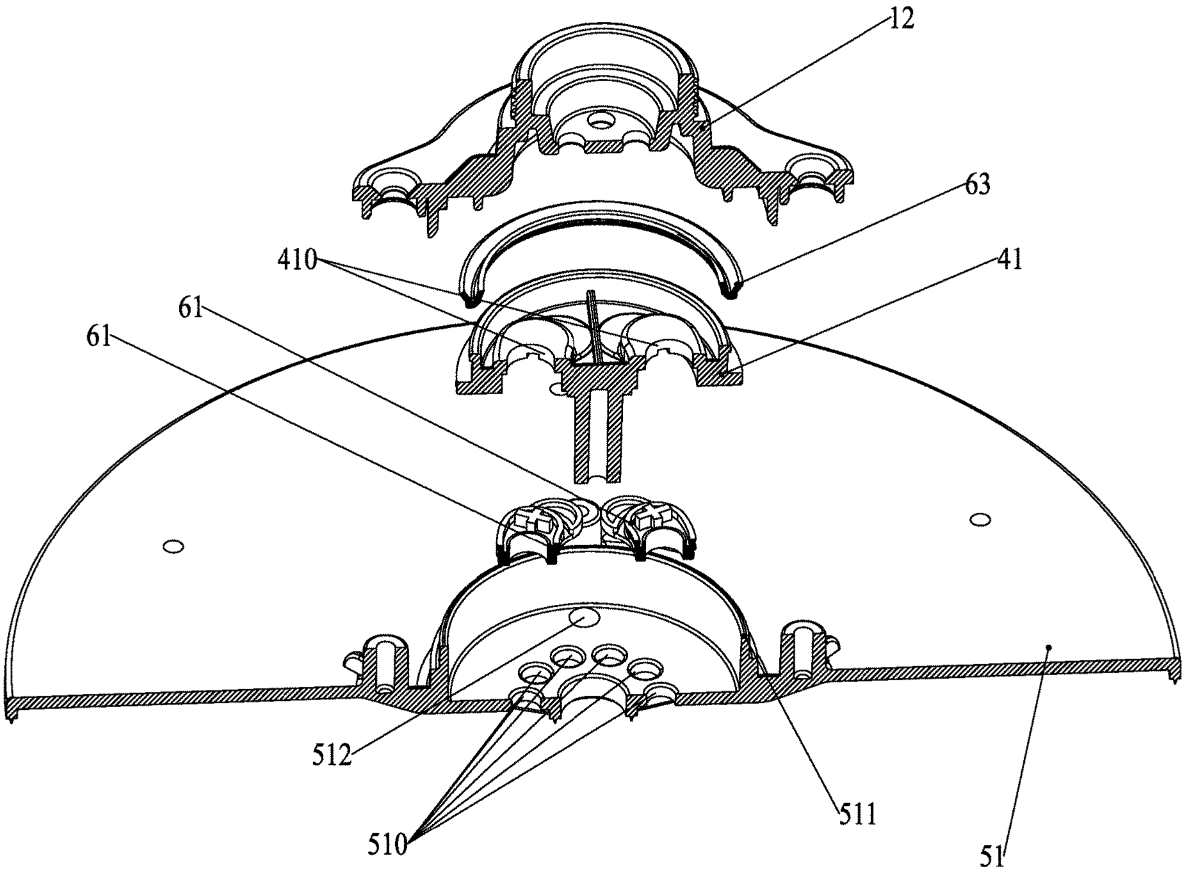
FIG. 7 is a schematic perspective semi-sectional view of parts according to an embodiment of the present application in an exploded state.
Figure 8:
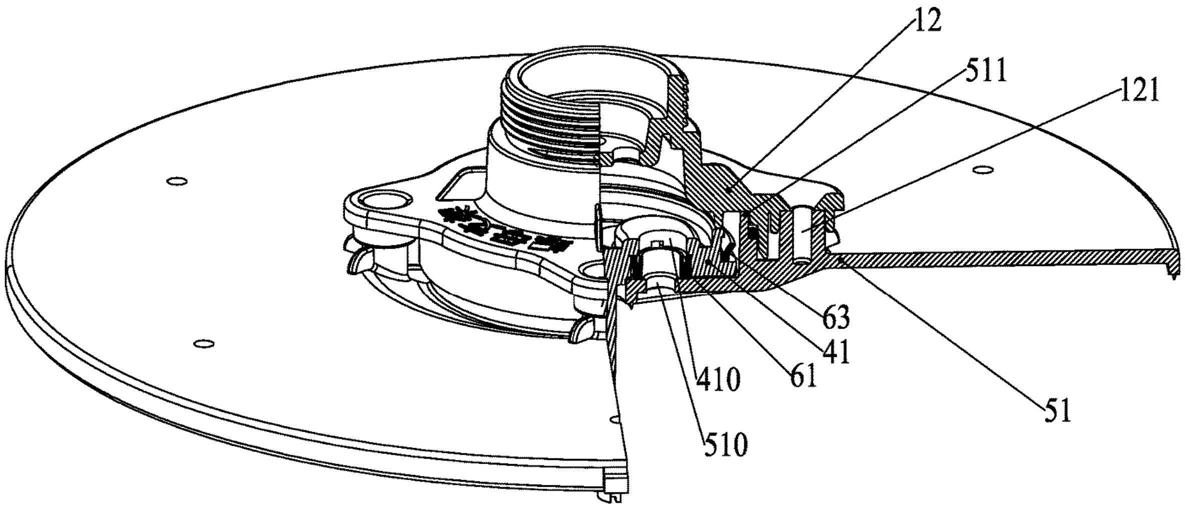
FIG. 8 is a perspective partial sectional view of an embodiment of the present application.

As shown in FIG. 4, The water outlet assembly 100 includes a fixed plate 51, a water diversion plate 52 and a water outlet cover. The fixed plate 51 and the water diversion plate 52 are fixed to each other, and its inner cavity contains at least two mutually separated water distribution passages 50, the water outlet cover is fixedly connected to the water outlet end surface of the water diversion plate 52, each of the water distribution passages 50 generates a specific functional water spray, such as massage water spray, bubble water spray, etc., and the water outlet body assembly 100 is fixedly connected to the seat body 72. Regarding the water outlet body assembly 100, it is a conventional technology and is not repeatedly described here. It is to be emphasized that the water outlet body assembly 100 cannot rotate relative to the seat body 72. A water sealing chamber 200 is formed between the seat body 72 and the water outlet body assembly 100. The water sealing chamber 200 includes a cylindrical support 12 and a circular retaining edge 511. The cylindrical support 12 has an opening facing downwards. The top of the cylindrical support 12 is provided with an installation hole 122 for a water inlet pipeline 421 of a valve body 4 to pass through. The circular retaining edge 511 is arranged to protrude on an end face, on a side facing towards the seat body 72, of the water outlet body assembly 100, and the cylindrical support 12 and the retaining edge 511 are arranged to define together the water sealing chamber 200 in an enclosing manner. The cylindrical support 12 and the retaining edge 511 disclosed in this embodiment are fixedly connected to each other through threaded connection by additionally providing several locking fasteners. That is, several threaded holes are provided in a water inlet end face of the fixed plate 51 of the water outlet body assembly 100, and three bolts are arranged on the cylindrical support 12. The cylindrical support 12 is fixed onto the water inlet end face of the water outlet body assembly 100 through the bolts. More preferably, as shown in FIG. 4, the water inlet pipeline 421 of the valve body 4 is inserted into the installation hole 122, and a first sealing ring 62 is arranged between contact surfaces of the water inlet pipeline 421 and the installation hole 122 to prevent water from flowing out from a gap between the water inlet joint 1 and the water inlet pipeline 421. Moreover, as shown in FIG. 7, a second sealing ring 63 is additionally provided between contact surfaces of the cylindrical support 12 and the retaining edge 511 to prevent water within the water sealing chamber 200 from flowing out of it and prevent water from dripping out of the product.

Figure 5:
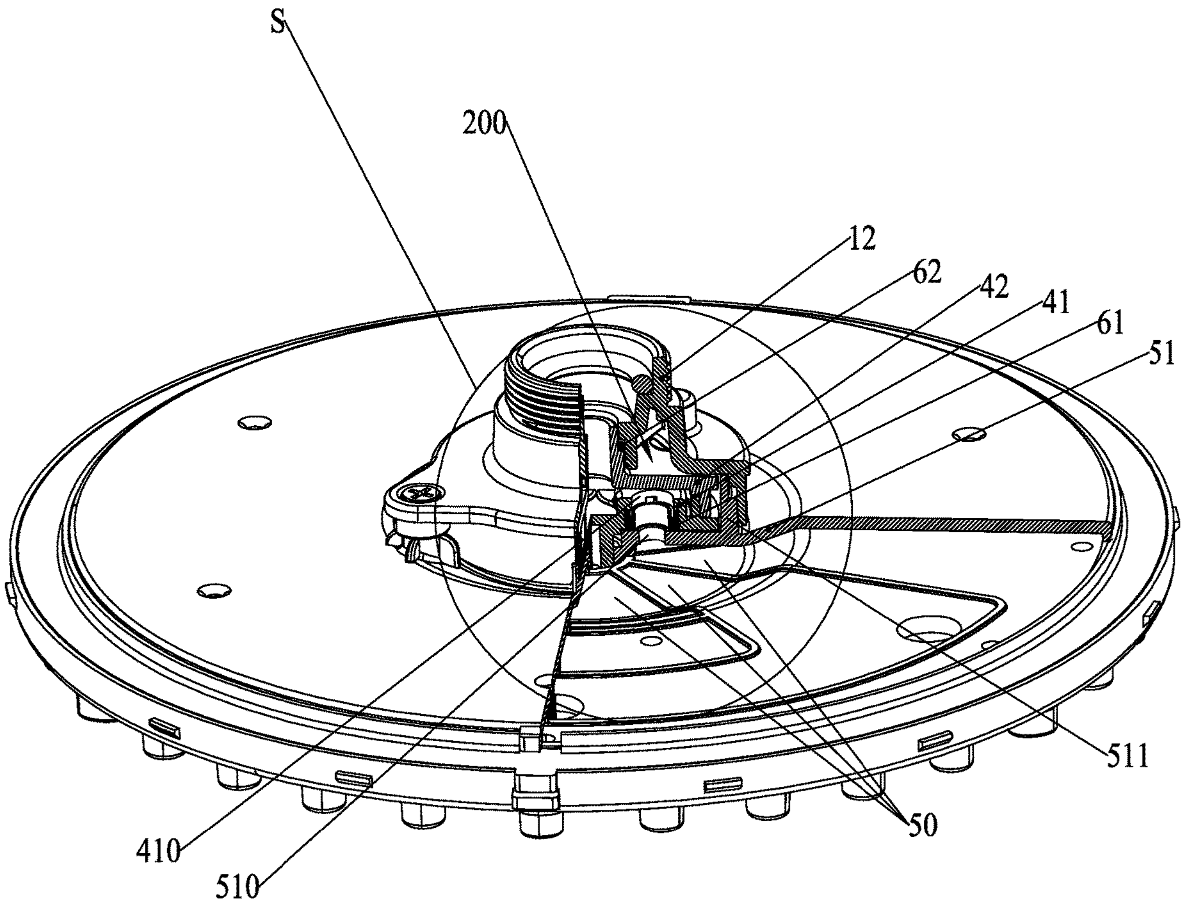
FIG. 5 is a perspective partial sectional view of some parts according to section A-A of FIG. 3.

As shown in FIGS. 1, 4, and 5, the water outlet body assembly 100 has a through passage 300 formed at a central portion corresponding to the water sealing chamber 200. More specifically, the fixed plate 51 extends a mounting cylinder 513 toward the direction of the water diversion plate 52, and the water diversion plate 52 defines a through hole at a position relative to the mounting cylinder 513, and the mounting cylinder 513 is inserted into the through hole. An inner cavity of the mounting cylinder 513 is configured to the through passage 300. The through passage 300 is separated from the water passages inside the water outlet body assembly 100, and each of the water distribution passages 50 is provided with at least one water-passing opening 510 in the water inlet end face of the water outlet body assembly 100, and the water-passing openings 510 are located inside the water sealing chamber 200 and are arranged circumferentially by taking the central axis L of the water sealing chamber 200 as the center and R as the radius of a circle.

Figure 6:
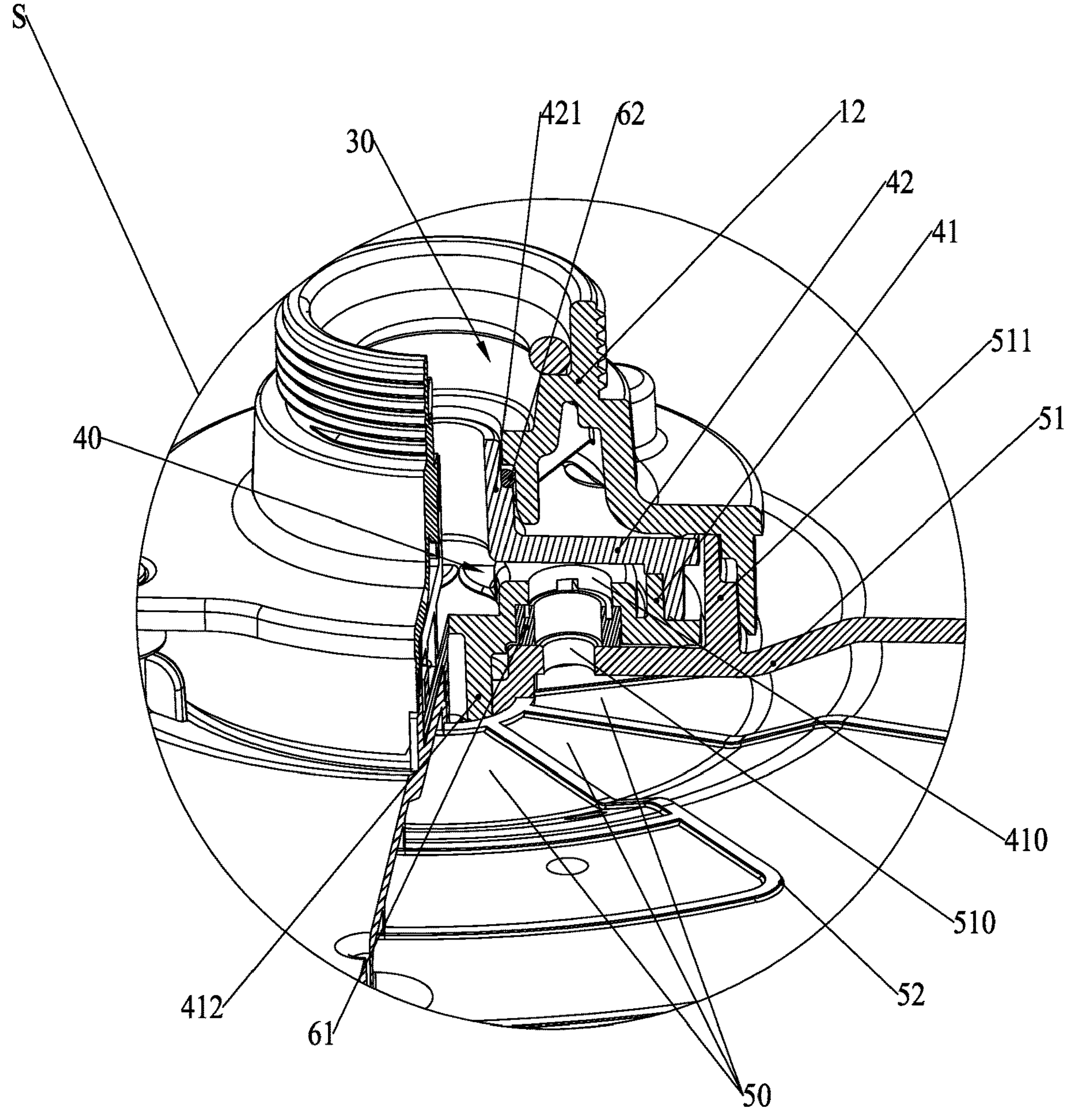
FIG. 6 is a schematic partially enlarged view based on FIG. 5.

As shown in FIGS. 1, 4 and 6, the water distribution valve 400 includes a valve body 4 and a connecting rod 412. The valve body 4 is in the shape of a disk. In this embodiment, the valve body 4 includes an upper cover 42 and a lower cover 41, which are welded to each other. An inner cavity of the water distribution valve 400 forms a water holding chamber 40, the upper cover 42 is provided with a water inlet pipeline 421 protruding at a central portion of the upper cover 42, and the water inlet pipeline 421 is in fluid communication with the water inlet joint 1. A connecting rod 412 is fixedly connected to a central portion of the lower cover 41, and the lower cover 41 is provided with at least one water distribution hole 410. It is preferred to symmetrically provide two water distribution holes 410 along the central axis L, thereby increasing the flow area of the water distribution valve 400. Each of the water distribution holes 410 has a water passage gasket 61 embedded therein, and the water passage gasket 61 has a through hole, which is in fluid communication with the respective water distribution hole 410. The valve body 4 is disposed within the water sealing chamber 200, the connecting rod 412 is disposed to pass through the through passage 300 formed by the mounting cylinder 513, and water accessing through the water inlet joint 1 flows into the water holding chamber 40 only through the water inlet pipeline 421 of the valve body 4, and flows out through the water distribution holes 410. It should be noted that in order to prevent water from seeping out from the gap formed by the connecting rod 412 and the mounting cylinder 513, a third sealing ring 65 is added between the connecting rod 412 and the mounting cylinder 513.

Figure 9:
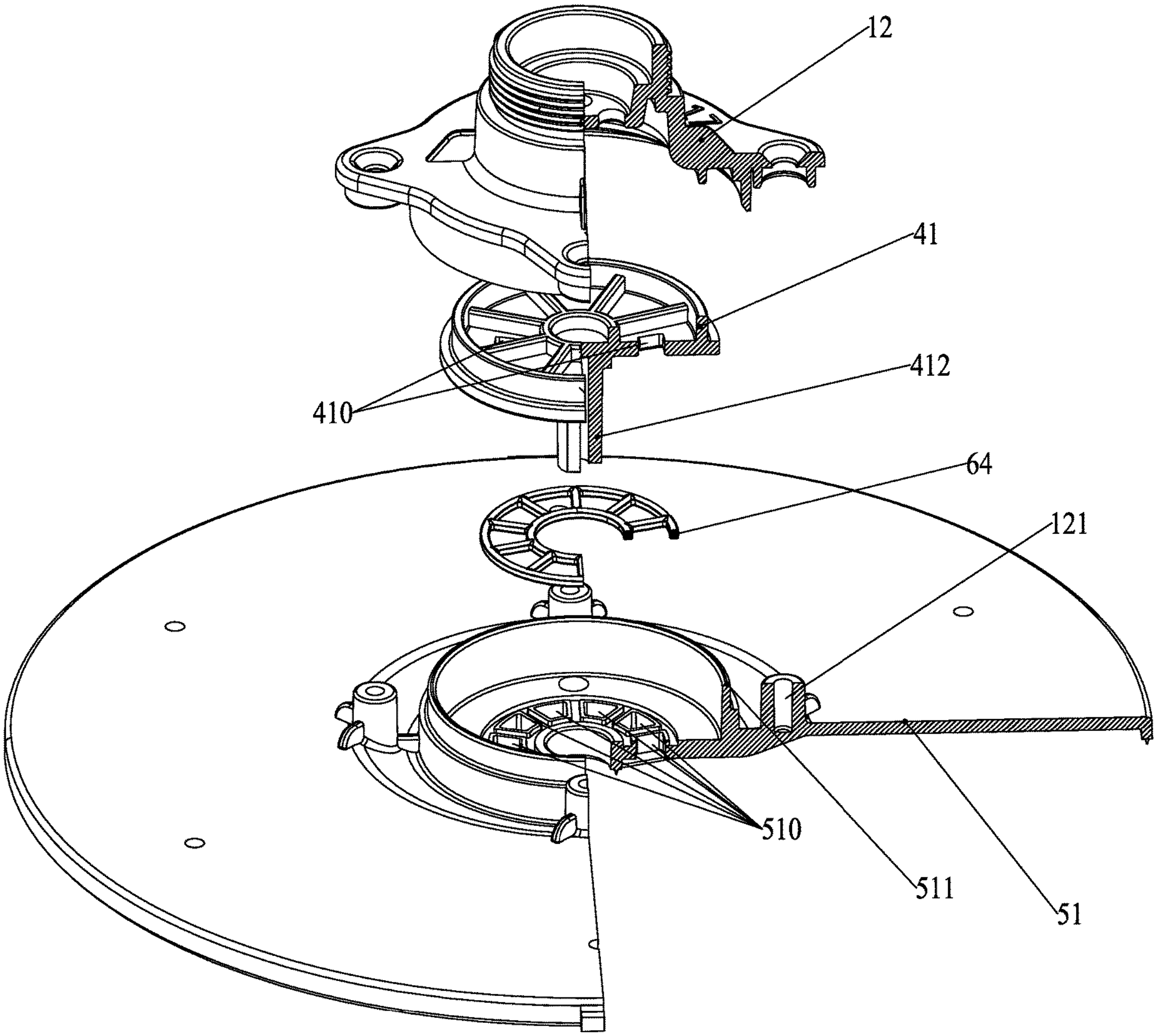
FIG. 9 is a schematic perspective semi-sectional view of parts according to an embodiment of the present application in an exploded state.
Figure 10:
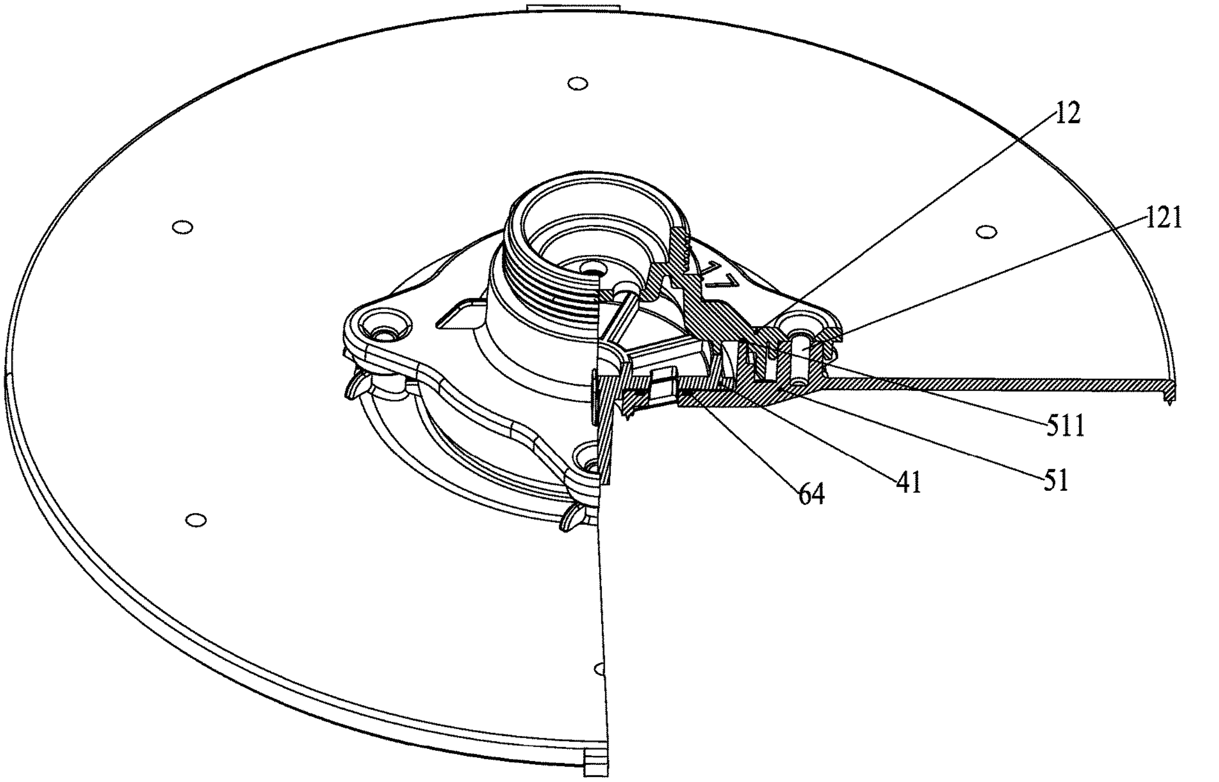
FIG. 10 is a perspective partial sectional view based on FIG. 9.
Figure 17:
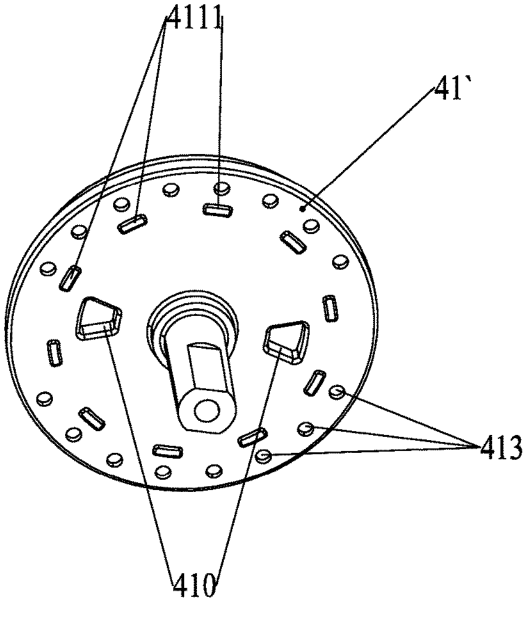
FIG. 17 is a schematic perspective view of a water distribution valve of an embodiment of the present application.

As shown in FIG. 9 and FIG. 17, the present application further discloses another embodiment in which a lower cover 41' (a bottom end face of the valve body 4) is not provided with the water passage gasket 61. This embodiment can also achieve seamless connection between the water distribution hole 410 of the water distribution valve 400 and the corresponding water-passing opening 510 of the water outlet body assembly 100. Specifically, an irregular shaped sealing ring 64 is additionally provided between the valve body 4 and the water inlet end face of the water outlet body assembly 100, the irregular sealing ring 64 can prevent water from flowing between adjacent water-passing openings 510 of the water outlet body assembly 100.

Figure 18:
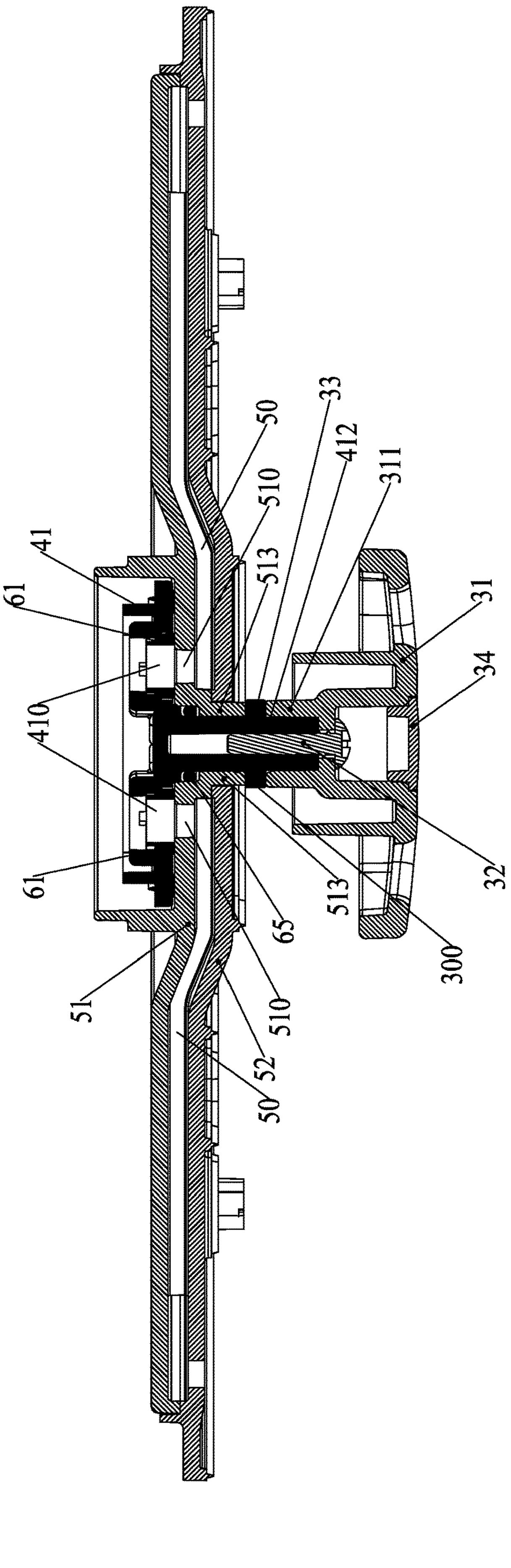
FIG. 18 is a schematic semi-sectional view of some parts of an embodiment of the present application.
Figure 19:
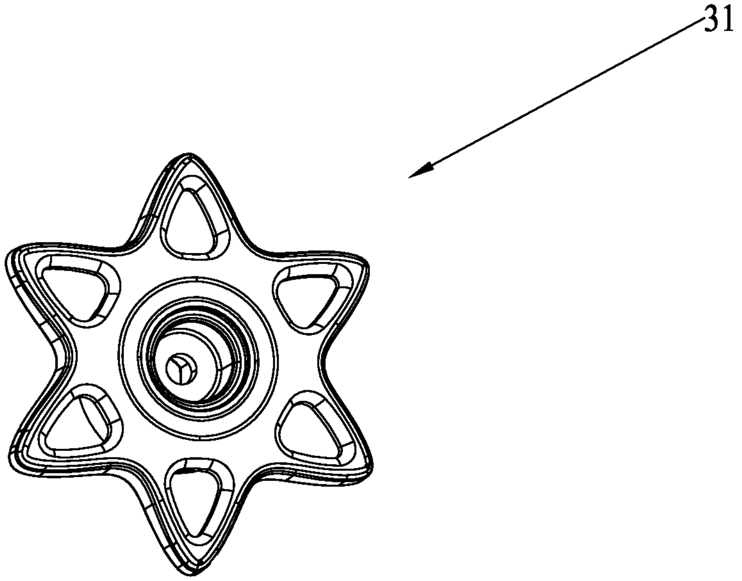
FIG. 19 is a schematic perspective view of a knob in an embodiment of the present application.
Figure 20:
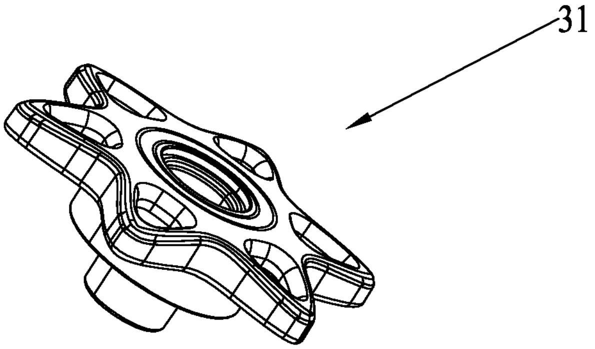
FIG. 20 is a schematic perspective view of a knob in an embodiment of the present application.

As shown in FIG. 1, FIG. 18, and FIG. 20, A knob assembly 3, which includes a knob 31 and a connecting member 32, the knob 31 is fixed to the connecting rod 412 through the connecting member 32, so that it is arranged on an outer end face of the water outlet assembly 100. More specifically, the knob 31 has a holding cylinder 311, and the holding cylinder 311 has an inner cavity for at least partially receiving the connecting rod 412, the knob 31 forms a counterbore at a position opposite to the holding cylinder 311, and the connecting member 32 passes through the counterbore and is fixedly connected with the connecting rod 412. Specifically, the connecting member 32 is a screw, At the same time, in order to make the shape of the knob 31 more aesthetically pleasing, a decorative cover 34 is added at the position where the knob 31 is located in the counterbore. A wear-resistant ring 33 is sleeved on an outer circumference of the connecting rod 412, and is arranged between the mounting cylinder 513 and the holding cylinder 311. Therefore, when the holding cylinder 311 rotates, the holding cylinder 311 will not directly rub the mounting cylinder 513, thereby avoiding noise and improving the service life of the product.

Figure 2:
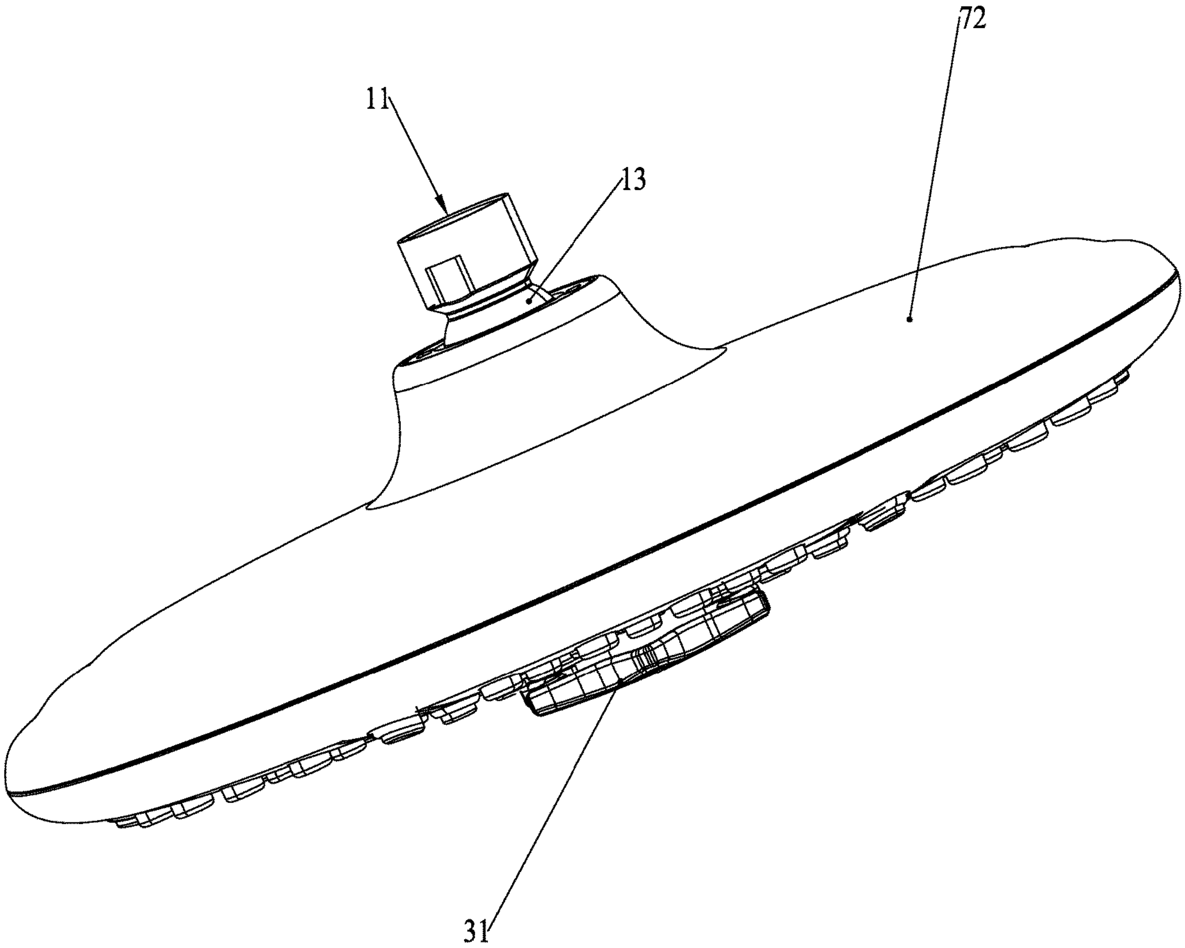
FIG. 2 is a schematic perspective view of an embodiment of the present application in an assembled state.
Figure 3:
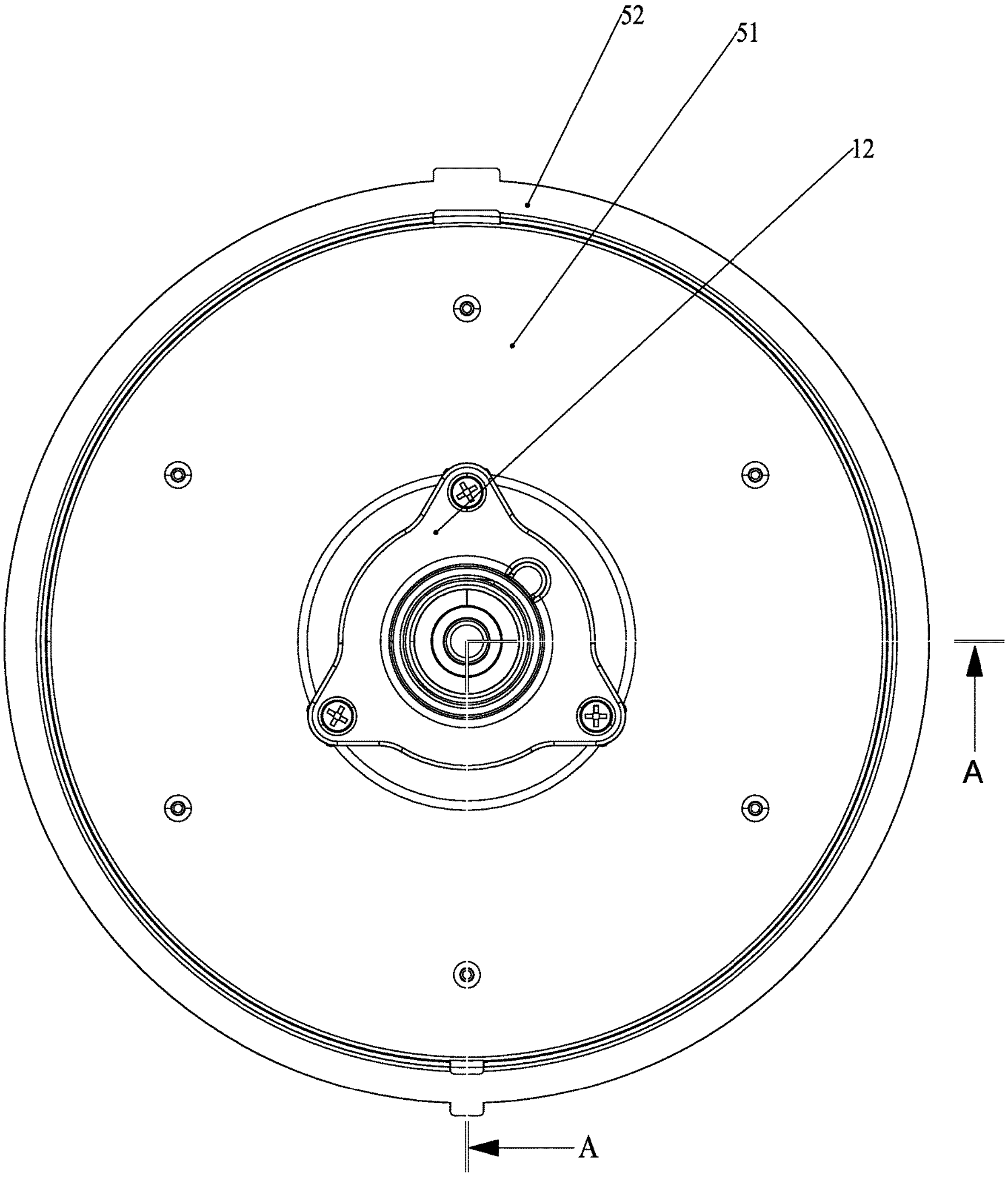
FIG. 3 is a top view of an embodiment of the present application.

In a preferred design, as shown in FIG. 1 and FIG. 2, the water inlet joint 1, the water sealing chamber 200, the water distribution valve 400, the through passage 300, and the knob 31 are all arranged to be centered.

As shown in FIG. 1 and FIG. 6, the water inlet joint 1 is connected to the seat body 72 through spherical hinging. Specifically, the water inlet joint 1 includes a spherical head water receiving part 13, an installation nut 14, and a threaded connecting port 123 provided at the top of the cylindrical support 12. The installation nut 14 is threadedly connected to the threaded connecting port 123 of the cylindrical support 12 and forms a position-limiting chamber 30. A spherical head of the spherical head water receiving part 13 is circumferentially rotatably disposed in the position-limiting chamber 30.

Figure 15:
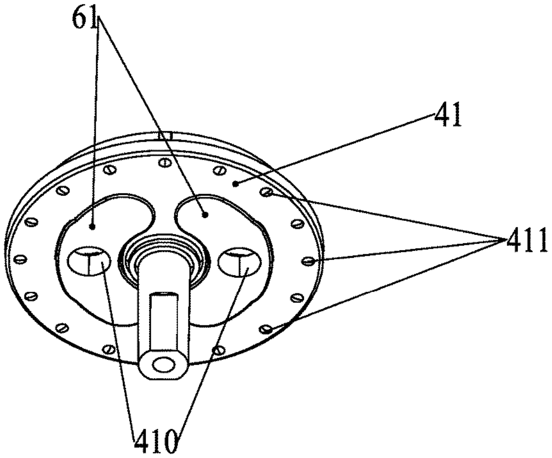
FIG. 15 is a schematic perspective view of a water distribution valve of an embodiment of the present application.
Figure 16:
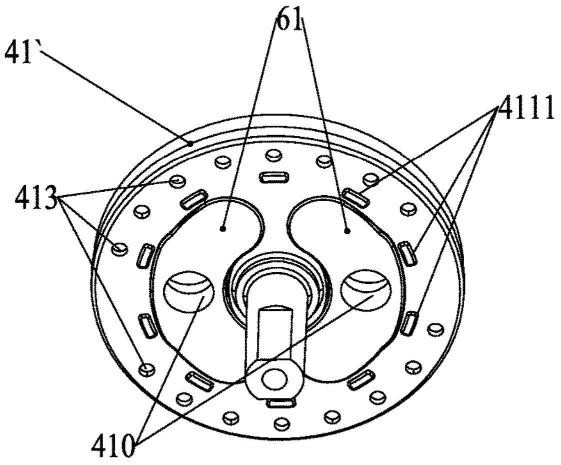
FIG. 16 is a schematic perspective view of a water distribution valve of an embodiment of the present application.

As shown in FIG. 15 to FIG. 17, a bottom surface of the valve body 41 is provided with several protrusions 4111, and abuts against the water inlet end face 51 by means of the several protrusions 4111. With such a design, the friction between the valve body 4 and the water inlet end face 51 of the water outlet body assembly 100 can be reduced, so that rotating the knob 31 is more labor-saving.

Figure 11:
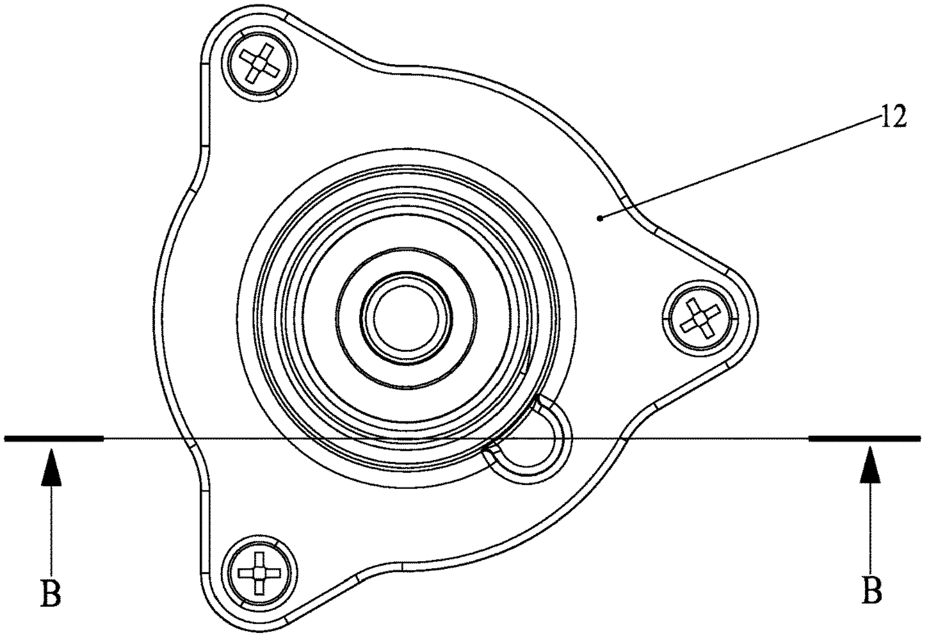
FIG. 11 is a top view of some parts of an embodiment of the present application.
Figure 12:
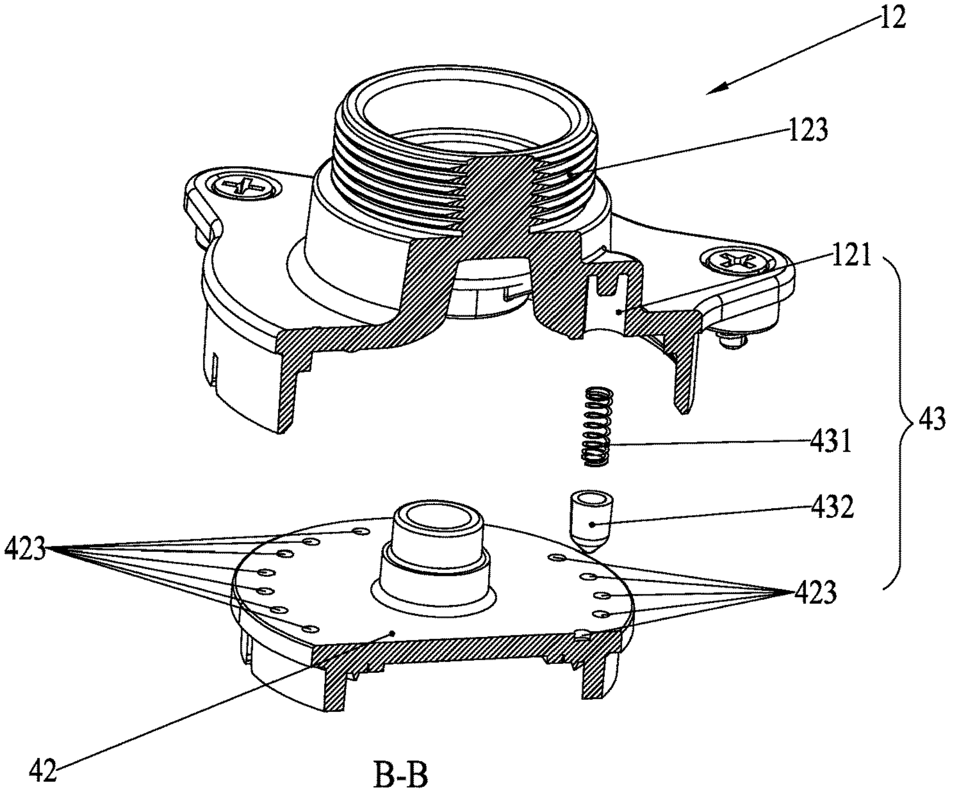
FIG. 12 is an exploded perspective sectional view of parts based on the B-B section in FIG. 11.

As shown in FIG. 11 and FIG. 12, the present application discloses one of embodiments of additionally providing a positioning sound component 43 between the cylindrical support 12 and the upper cover 42. The positioning sound component 43 includes a spring 431 and a positioning head 432. The cylindrical support 12 has a first holding hole 121 with an opening facing downwards, and one end of the spring 431 is pressed against the first holding hole 121, while the other end is connected to the positioning head 432. A top end face of the valve body 4 is provided with several first positioning counterbores 423. When the valve body 4 rotates in a circumferential direction, the positioning head 432 switches between the first positioning counterbores 423 and generates a positioning sound.

Figure 13:
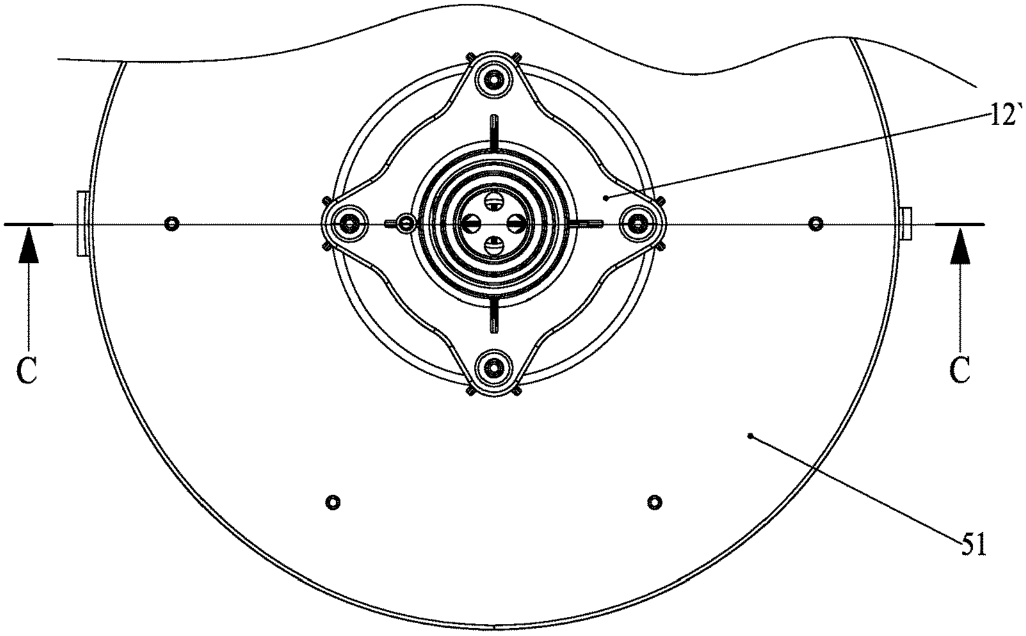
FIG. 13 is a top view of some parts of an embodiment of the present application.
Figure 14:
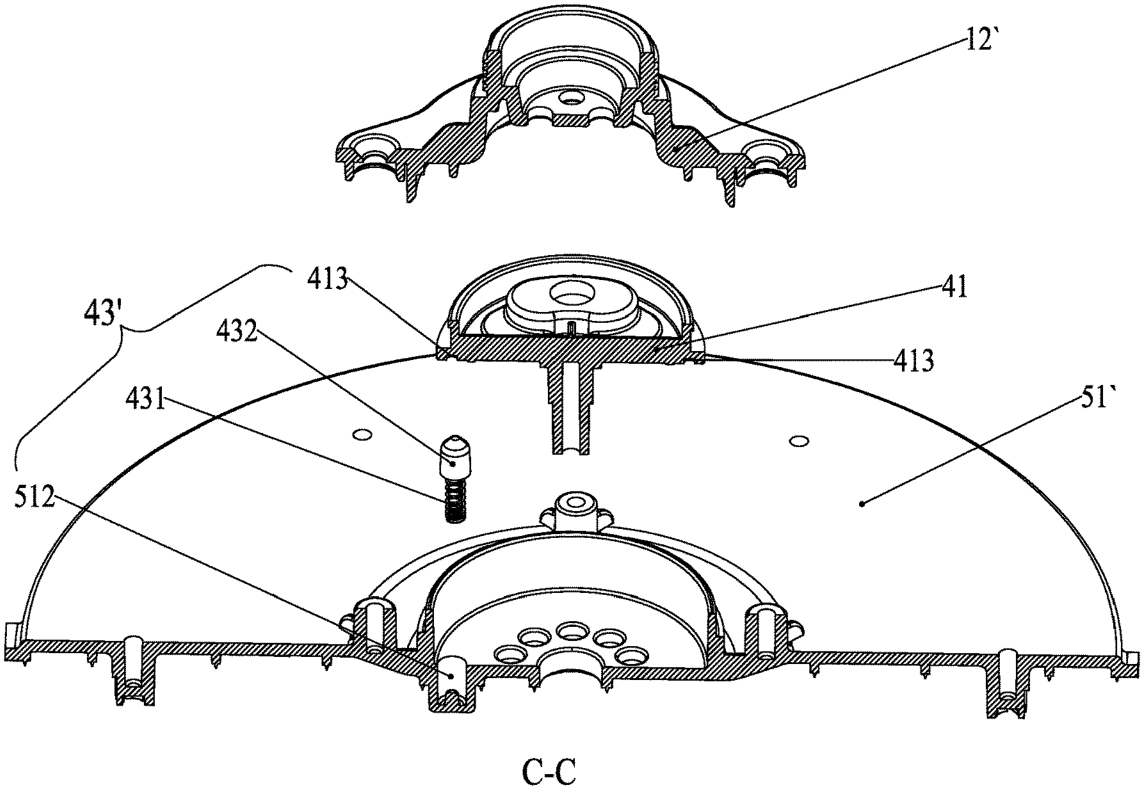
FIG. 14 is an exploded perspective sectional view of parts based on the C-C section of FIG. 13.

As shown in FIG. 13 and FIG. 14, the present application also discloses a positioning sound component 43' according to another embodiment, the positioning sound component 43' includes a positioning spring 431 and a positioning head 432, and is arranged between the water outlet body assembly 100 and the valve body 4. The water inlet end face of the water outlet body assembly 100 has a second holding hole 512 with an opening facing upward, one end of the spring 431 is pressed against the second holding hole 512, while the other end of the spring 431 is connected to the positioning head 432, and the bottom of the valve body 4 is provided with several second positioning counterbores 413 for matching with the positioning head 432. When the valve body 4 rotates in a circumferential direction, the positioning head 432 switches between the second positioning counterbores 413 and generates a positioning sound.

The working principle of the present application is as follows.

The knob 31 is rotated by an external force, and further drives the valve body 4 to rotate by 360° about the central axis L, to allow the water distribution holes 410 of the valve body 4 to be selectively in fluid communication with the water-passing openings 510 of the water distribution passages 50 entirely or partially, thereby achieving water passage switching for water spray of different functions.

The above description merely relates to embodiments of the present disclosure, and is not intended to limit the design of the present disclosure. Any equivalent changes made according to key points of the design of the present disclosure will fall within the scope of protection of the present disclosure.

What is claimed is:

1. A showerhead with a water passage switching structure, comprising:

a seat body comprising a water inlet joint, wherein the water inlet joint is configured to connect externally with a water outlet pipeline;

a water outlet body assembly fixedly connected to the seat body, wherein the water outlet body assembly comprises at least two mutually separated water distribution passages, each of the water distribution passages generates a specific functional water spray; a water sealing chamber is formed between the seat body and the water outlet body assembly, the water outlet body assembly has a through passage formed at a first central portion corresponding to the water sealing chamber, the through passage is separated from the water passages inside the water outlet body assembly, and each of the water distribution passages is provided with at least one water-passing opening in water inlet end face of the water outlet body assembly, and the water-passing openings are located inside the water sealing chamber and are arranged circumferentially by taking a central axis L of the water sealing chamber as the center and R as radius of a circle;

a water distribution valve, comprising a valve body and a connecting rod, wherein the valve body is in shape of a disk, an inner cavity of the water distribution valve forms a water holding chamber, the valve body is provided with a water inlet pipeline at a second central portion of a first end face, on one side, of the valve body, and the water inlet pipeline is in fluid communication with the water inlet joint, connecting rod is fixedly connected to a third central portion of a second end face, on the other side, of the valve body, and the second end face on the other side of the valve body is provided with at least one water distribution hole, the valve body is disposed within the water sealing chamber, and the connecting rod is disposed to pass through the through passage, water accessing through the water inlet joint flows into the water holding chamber only through the water inlet pipeline of the valve body, and flows out through the at least one water distribution hole; and a knob, arranged on an outer end face of the water outlet body assembly and fixedly connected to the connecting rod, wherein the knob is rotated by an external force, and further drives the valve body to rotate by 360° about the central axis L of the water sealing chamber, to allow the at least one water distribution hole of the valve body to be selectively in fluid communication with the respective water-passing openings of the water distribution passages entirely or partially, thereby achieving water passage switching for water spray of different functions.

2. The showerhead according to claim 1, wherein the water inlet joint, the water sealing chamber, the water distribution valve, the through passage, and the knob are all arranged at a center portion of the showerhead.

3. The showerhead according to claim 1, wherein the water sealing chamber comprises a cylindrical support and a circular retaining edge, a top of the cylindrical support is provided with an installation hole for the water inlet pipeline of the valve body to pass through, the circular retaining edge is arranged to protrude on an end face of the water outlet body assembly towards the seat body, and the cylindrical support and the retaining edge are arranged to define together the water sealing chamber in an enclosing manner.

4. The showerhead according to claim 2, wherein the water inlet pipeline of the valve body is inserted into the installation hole, and a first sealing ring is arranged between the water inlet pipeline and the installation hole.

5. The showerhead according to claim 3, wherein a second sealing ring is additionally provided between the cylindrical support and the retaining edge.

6. The showerhead according to claim 3, wherein the cylindrical support and the retaining edge are fixedly connected to each other by additionally providing a plurality of locking fasteners.

7. The showerhead according to claim 3, wherein the water inlet joint is connected to the seat body through spherical hinging, the water inlet joint comprises a spherical head water receiving part, an installation nut and a threaded connecting port provided at the top of the cylindrical support, the installation nut is threadedly connected to the threaded connecting port of the cylindrical support and forms a position-limiting chamber, and a spherical head of the spherical head water receiving part is circumferentially rotatably disposed in the position-limiting chamber.

8. The showerhead according to claim 1, wherein the valve body is composed of an upper cover and a lower cover welded to each other, the water inlet pipeline is arranged to protrude at a central portion of the upper cover, the lower cover is provided with two water distribution holes symmetrically distributed along the central axis L of the water sealing chamber, and each of the water distribution holes has a water gasket embedded therein.

9. The showerhead according to claim 1, wherein an irregular shaped sealing ring is additionally provided between the valve body and the water inlet end face of the water outlet body assembly, the irregular shaped sealing ring has a shape matching inlet end contours of water-passing openings in the water inlet end face of the water outlet body assembly, and is configured to prevent water from flowing between adjacent water-passing openings.

10. The showerhead according to claim 1, wherein a bottom surface of the valve body is provided with a plurality of protrusions, and abuts against the water inlet end face by means of the plurality of protrusions.

11. The showerhead according to claim 2, further comprising a first elastic positioning part, wherein the first elastic positioning part comprises a first spring and a first positioning head, the cylindrical support has a first holding hole with an opening facing downwards, and one end of the first spring is pressed against the first holding hole, while the other end of the first spring is connected to the first positioning head; a top end face of the valve body is provided with a plurality of first positioning counterbores; and when the valve body rotates in a circumferential direction, the first positioning head switches between the first positioning counterbores and generates a positioning sound.

12. The showerhead according to claim 1, further comprising a second elastic positioning part, wherein the second elastic positioning part comprises a second spring and a second positioning head, and is arranged between the water outlet body assembly and the valve body, the water inlet end face of the water outlet body assembly has a second holding hole with an opening facing upwards, one end of the second spring is pressed against the second holding hole, while the other end of the second spring is connected to the second positioning head; and a bottom of the valve body is provided with a plurality of second positioning counterbores for matching with the second positioning head, and when the valve body rotates in a circumferential direction, the second positioning head switches between the second positioning counterbores and generates a positioning sound.

* * * * *